Aug. 31, 1926.
M. B. BULGER
1,598,047
STATIONARY DRINKING BOWL
Filed July 27, 1922    2 Sheets-Sheet 2
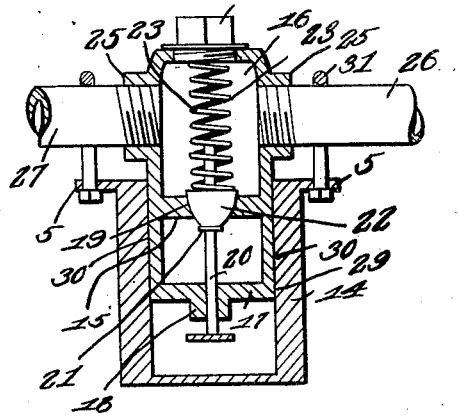
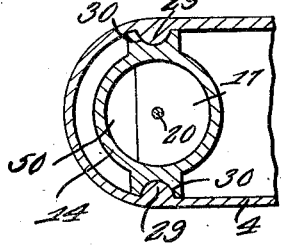
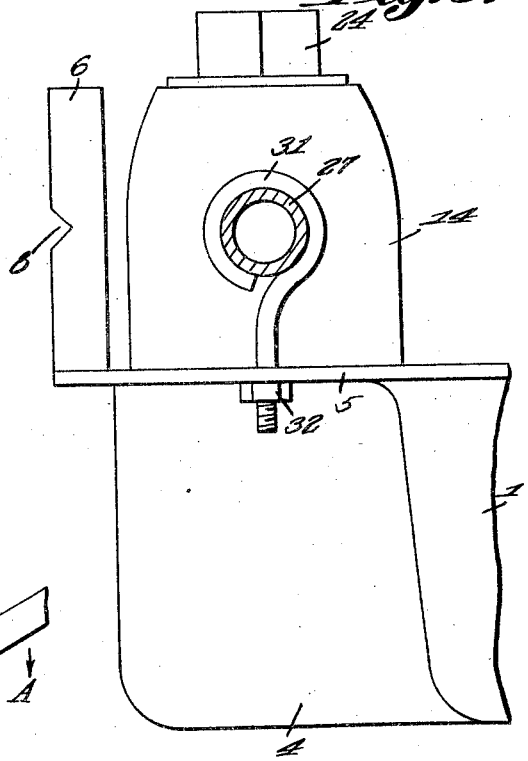
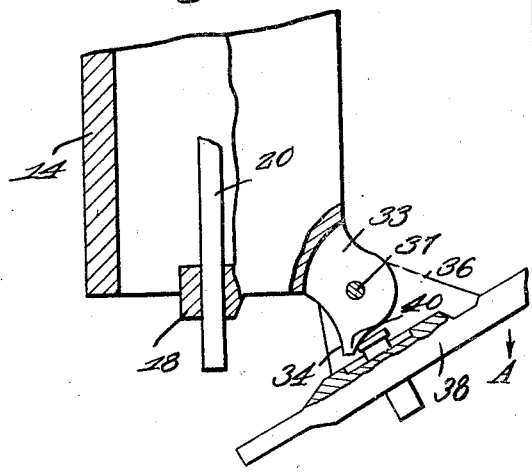
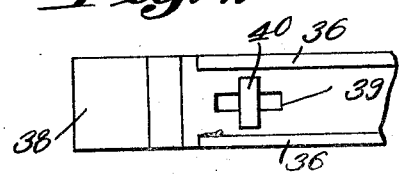
M. B. Bulger, Inventor Patented Aug. 31, 1926.

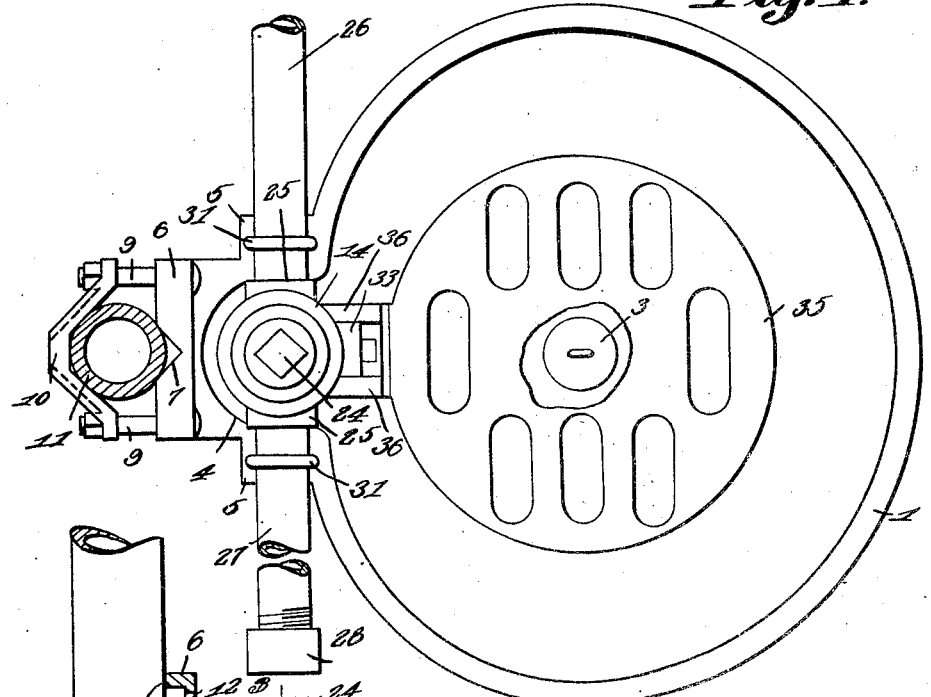

1,598,047

UNITED STATES PATENT OFFICE.

MICHAEL B. BULGER, OF BEAVER DAM, WISCONSIN, ASSIGNOR TO MIDDLE WEST MFG. CO., INC., OF BEAVER DAM, WISCONSIN.

STATIONARY DRINKING BOWL.

Application filed July 27, 1922. Serial No. 577,955.

The device forming the subject matter of this application is a bowl or fountain, adapted for the use of animals, and one object of the invention is to provide novel means for mounting the valve casing detachably on the bowl. Another object of the invention is to provide novel means whereby, at the will of an operator, the device may be so set that an animal cannot operate the valve to secure a supply of water.

In the accompanying drawings:—

Figure 1 shows in top plan, a device constructed in accordance with the invention, parts being broken away, and parts appearing in section; Figure 2 is a vertical transverse section wherein parts appear in elevation; Figure 3 is a fragmental sectional view on the line 3—3 of Figure 2; Figure 4 is a fragmental horizontal section on the line 4—4 of Figure 2; Figure 5 is a side elevation showing the valve casing and a portion of the bowl; Figure 6 is a sectional view illustrating the operating lever locked in such a position that it cannot be operated to effect a discharge of water into the bowl; and Figure 7 is a fragmental top plan showing a portion of the lever and the latch which is carried thereby.

In carrying out the invention there is provided a bowl, comprising a body 1 supplied with a drainage nipple 2 controlled by a valve 3 of any desired sort, the valve being in the form of a plug if preferred. It will be obvious that by removing the plug 3, the water may be drained out of the bowl, and the bowl may be cleaned without dipping the contents of the bowl therefrom. The body 1 of the bowl has a rearwardly prolonged radial extension 4 supplied on its sides with vertical ribs 29, as shown in Figures 4 and 3. Flanges 5 are located at the sides where the extension 4 joins the body 1 of the bowl. The extension 4 has an upstanding arm 6, which may be of box-like hollow construction. Notches or seats 7 are formed in the arm 6 at the top and at the bottom thereof, and the arm has side notches 8. Securing elements 9, such as bolts, are mounted in the arm 6, removably, and are adapted to cooperate with a yoke 10. If a vertical support 11 is available, the support is received in the notches 7 and fits in the yoke 10, the securing elements 9 being tightened up to hold the bowl in place on the support, as shown best in Figure 2. Adjacent to its top and bottom, the arm 6 is supplied with openings 12 if the support happens to be horizontally disposed, the support is received in the side notches 8, the securing elements 9 are shifted to the openings 12, and the yoke 10 is turned at ninety degrees, from the position shown in Figure 1, the device thus being adapted to a horizontal support. If the support is in the form of a board, wall or partition, the yoke 10 may be dispensed with, the bolts 9 passing through the support. In view of the foregoing, the device is so constructed that it may be mounted on supports of widely different sorts.

The device embodies a valve casing or font 14, which is of tubular form, the valve casing extending downwardly into the extension 4 of the body 1 of the bowl. The casing 14 has an upper partition 15 defining an upper chamber 16. The casing 14 is supplied with a lower partition 17 having a depending boss 18. The lower partition 17 extends but part way across the casing 14, transversely, as shown in Figure 4, so that there exists, at the back of the casing, an opening 50 of ample size to permit the water to pass from the casing 14, downwardly into the extension 4 and, thence into the body 1 of the bowl without spattering. In the upper partition 15, a seat 19 is formed.

The device embodies a valve, including a rod 20 mounted to slide in the boss 18 and carrying an abutment 21 supporting a valve 22, adapted to cooperate with the seat 19 under the impulse of a helical compression spring 23, the lower end of the spring 23 engaging the valve 22 and being disposed about the upper end of the rod 20, the upper end of the spring bearing against a closure 24, giving access to the chamber 16, so that the same may be cleaned out, the closure being in the form of a plug, if desired, threaded into the upper end of the casing 14.

The valve casing 14 is supplied with oppositely projecting nipples 25. One of these nipples is adapted to receive a supply pipe 26, whereby water is delivered into the chamber 16, the other of the nipples being adapted to receive an air chamber, which may be in the form of a pipe 27 carrying a cap 28. The use of the air chamber is not insisted upon, but it will be found to be useful where the pressure is considerable. It is obvious that the supply pipe 26 may be shifted to the position of the pipe 27, the pipe 27 replacing the pipe 26, in Figure 1, so that the water may be led into the valve casing or font 14 from either side thereof. The casing or font 14 is provided with grooves or seats 30, adapted to receive the ribs 29 on the extension 4, the ribs and the grooves cooperating to hold the casing 14 against horizontal movement. In order to hold the casing 14 in place against vertical movement adjustably, the pipes 26 and 27, which may be denominated projections on the casing 14, are engaged by anchors 31, such as U-bolts, the anchors passing downwardly through the flanges 5 and carrying nuts 32 cooperating with the flanges as shown in Figure 5. The valve casing 14 is provided with an outwardly extended lug 33 having a depending projection 34 as shown in Figure 6.

Within the body 1 of the bowl is located a lever 35, under the control of an animal, and often in the form of a perforated plate, having ears 35 and supplied with a rearwardly extended arm 38. A pivot element 37 is mounted in the ears 36 of the lever 35 and in the lug 33 of the valve casing 14, the lever thus being assembled with the valve casing for vertical swinging movement. The rear end of the arm 38 of the lever extends beneath the valve rod 20, as depicted in Figures 2, 3 and 6. A depression or seat 39 is formed in the upper surface of the arm 38 of the lever 35. The structure includes a latch, comprising a stem 41 and an elongated head 40. The stem 41 of the latch is slidable and rotatable in the arm 38 of the lever, the head 40 in the ordinary operation of the device being received in the depression 39, and being so located that, when the lever 35 is swung vertically, the head 40 of the latch will not engage the projection 34 of the lug 33 on the valve casing 14. The parts are thus delineated in Figure 2.

In practical operation, when the nose of an animal is inserted into the body 1 of the bowl, the lever 35 is swung downwardly on its pivotal mounting 37, and the arm 38 of the lever swings upwardly the valve stem or rod 20 being raised and the valve 32 being moved off the seat 19 in the partition 15, whereupon water delivered into the chamber 16 through the pipe 26 will flow downwardly through the opening 50 in the valve casing 14 and through the extension 4 into the body 1 of the bowl.

It may be that, owing to the fact that an animal is overheated, or from some other cause, it is not desirable that the animal be permitted to drink. Under such circumstances, the lever 35 may be locked in the position shown in Figure 6. In order to lock the lever, the latch is raised and rotated, the head 40 of the latch being raised out of the depression 39 in the arm 38 of the lever and being disposed cross wise of the depression 39, as shown in Figures 6 and 7, the head 40 of the latch then lying in the path of the projection 34 on the lug 33 of the valve casing 14, it being obvious that the lever cannot be swung downwardly by an animal in the direction of the arrow A in Figure 6. Since the lever 35 thus is held against movement, the valve mechanism 20—22 cannot be actuated, and no water will be discharged into the bowl.

What is claimed is:—

1. In a device of the class described, a bowl; a casing discharging into the bowl and provided upon its sides with an inlet and with an air chamber which outstand laterally in opposite directions; a valve in the casing and controlling the flow into the bowl; a lever in the bowl and constituting means for opening the valve, the lever being fulcrumed on the casing; and draw anchors detachably connected with the inlet and with the air chamber and with the bowl.

2. A device of the class described, constructed as set forth in claim 1, and further characterized by the fact that the bowl has oppositely disposed upright ribs, the casing having correspondingly located upright grooves which receive the ribs, the drawanchors constituting means for holding the ribs in place in the grooves.

3. In a device of the class described, a bowl and a member discharging into the bowl, a valve in said member and controlling the flow into the bowl; a lever fulcrumed for swinging movement in the bowl and so positioned as to be operated by an animal drinking out of the bowl, to open the valve; and a latch on the lever, the latch being normally out of engagement with said member, and being adjustable to engage said member thereby to prevent a swinging movement of the lever and an opening of the valve.

4. In a device of the class described, a bowl and a casing discharging into the bowl; a valve in the casing and controlling the flow into the bowl a lever fulcrumed for swinging movement in the bowl and constituting means for operating the valve, the lever being provided with a depression; and a latch comprising a stem and a head, the stem being rotatable and slidable in the lever, and the head being received in the depression, the latch being movable with respect to the lever, to dispose the head of the latch transversely of the depression and in the path of a portion of the casing, whereby said portion of the casing, cooperating with the head of the latch, will hold the lever against movement to open the valve.

In testimony that I claim the foregoing as my own, I have hereto affixed my signature.

MICHAEL B. BULGER.